US012429375B2

(12) United States Patent
Lin et al.

(10) Patent No.: US 12,429,375 B2
(45) Date of Patent: Sep. 30, 2025

(54) SPECTROMETER SYSTEM WITH VOLUME HOLOGRAPHIC LIGHT GUIDE ELEMENT (71) Applicant: NATIONAL CENTRAL UNIVERSITY, Taoyuan (TW)

(72) Inventors: Wen-Kai Lin, Taoyuan (TW); Shao-Kui Zhou, Taoyuan (TW); Wei-Chia Su, Taoyuan (TW); Ching-Cherng Sun, Taoyuan (TW); Shiuan-Huei Lin, Taoyuan (TW); Yeh-Wei Yu, Taoyuan (TW); Tsung-Hsun Yang, Taoyuan (TW)

(73) Assignee: NATIONAL CENTRAL UNIVERSITY, Taoyuan (TW)

( * ) Notice: Subject to any disclaimer, the term of this patent is extended or adjusted under 35 U.S.C. 154(b) by 100 days.

(21) Appl. No.: 18/601,906

(22) Filed: Mar. 11, 2024

(65) Prior Publication Data

US 2025/0198842 A1    Jun. 19, 2025

(30) Foreign Application Priority Data

Dec. 18, 2023    (TW) .................................. 112149338

(51) Int. Cl.
*G01J 3/28*    (2006.01)
*G01J 3/02*    (2006.01)
*G01J 3/18*    (2006.01)

(52) U.S. Cl.
CPC ........... *G01J 3/1838* (2013.01); *G01J 3/0202* (2013.01); *G01J 3/0208* (2013.01)

(58) Field of Classification Search
CPC .......... G01J 3/1838; G01J 3/28; G01J 3/0202; G01J 3/0208; G01J 3/0205; G02B 5/32;
(Continued)

(56) References Cited

U.S. PATENT DOCUMENTS 5,224,198 A * 6/1993 Jachimowicz ......... G02B 6/003
359/13
5,448,659 A * 9/1995 Tsutsui ................... G02B 6/124
359/2

(Continued)

FOREIGN PATENT DOCUMENTS

WO    WO-9835182 A1 *  8/1998  ........... G02B 6/0038

*Primary Examiner* — Abdullahi Nur
(74) *Attorney, Agent, or Firm* — Juan Carlos A. Marquez; Marquez IP Law Office, PLLC (57) ABSTRACT

A spectrometer system with a volume holographic light guide element includes two focusing lenses in addition to the volume holographic light guide element, which has a light guide element and two volume holographic elements. The first focusing lens receives the light emitted by a to-be-tested light source at a first focal plane of the first focusing lens and makes the light converge and form plural collimated light beams that are projected to, and diffracted and coupled into the light guide element by, the first volume holographic element, are then received and coupled out of the light guide element by the second volume holographic element, and are subsequently received and focused on a sensing element by the second focusing lens. Each collimated light beam enters and exits the light guide element at the same angle. The spectrometer system can measure the intensity/chromatic uniformity of a relatively weak point/surface light source efficiently.

7 Claims, 5 Drawing Sheets

(58) Field of Classification Search
CPC ........ G02B 5/0252; G02B 5/18; G02B 5/203; G02B 6/00
See application file for complete search history.

(56) References Cited

U.S. PATENT DOCUMENTS

| | | | | |
|---|---|---|---|---|
| 5,455,693 | A * | 10/1995 | Wreede | G03H 1/22 359/34 |
| 6,169,613 | B1 * | 1/2001 | Amitai | G02B 6/34 359/33 |
| 10,670,876 | B2 * | 6/2020 | Popovich | G02B 6/0038 |
| 11,307,432 | B2 * | 4/2022 | Popovich | G02F 1/3136 |
| 2016/0349517 | A1 * | 12/2016 | Miyasaka | G02B 5/3016 |

* cited by examiner

SPECTROMETER SYSTEM WITH VOLUME HOLOGRAPHIC LIGHT GUIDE ELEMENT

BACKGROUND OF THE INVENTION

1. Technical Field

The present invention relates to a spectrometer system with a volume holographic light guide element. More particularly, the invention relates to a spectrometer system that has a volume holographic light guide element and can be used to measure the intensity uniformity or chromatic uniformity of a relatively weak point or surface light source.

2. Description of Related Art

Figure 1:
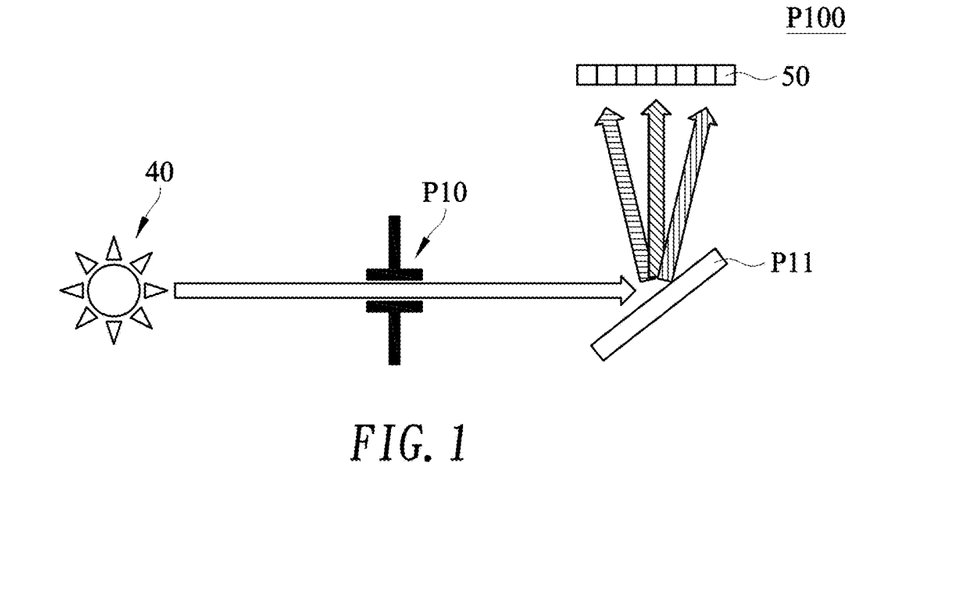
FIG. 1 schematically shows a conventional spectrometer structure.

Referring to FIG. 1, a conventional spectrometer structure system P100 requires a slit P10 for increasing the spatial coherence of a to-be-tested light source 40. The light of the to-be-tested light source 40 passes through the slit P10 and is separated by a thin diffraction grating P11 into beams of different wavelengths. The beams are projected to different positions on a sensing element 50 so that the readings obtained from those positions can be used to determine the spectrum of the light of the to-be-tested light source 40. The slit P10 in this structure, however, limits the amount of the light reaching the thin diffraction grating P11, and the thin diffraction grating P11 itself has relatively low efficiency. As a result, the conventional spectrometer structure system P100 makes relatively inefficient use of energy and therefore has difficulty in measuring a relatively weak light source.

SUMMARY OF THE INVENTION

The present invention is directed to a spectrometer system with a volume holographic light guide element. The spectrometer system is intended mainly to solve, among others, the problem that the relatively inefficient use of energy by a conventional spectrometer structure system causes difficulty in measuring a relatively weak light source. Moreover, the spectrometer system can be used to measure the uniformity of a surface light source.

The present invention provides a spectrometer system that has a volume holographic light guide element. The spectrometer system includes a first focusing lens and a second focusing lens in addition to the volume holographic light guide element. The volume holographic light guide element has: a light guide element whose surface has a first portion, a second portion, a third portion, and a fourth portion; a first volume holographic element provided on the first portion; and a second volume holographic element provided on the third portion. The first focusing lens is provided at a position corresponding to the second portion, and the first focusing lens is configured to receive the light emitted by the point light sources at different positions on the light-emitting area of a to-be-tested light source provided at a first focal plane of the first focusing lens and make the light converge and form a plurality of collimated light beams that propagate at different angles while being projected to the first volume holographic element. The first volume holographic element diffracts the plurality of collimated light beams and couples the plurality of collimated light beams into the light guide element. The second volume holographic element receives the plurality of collimated light beams coupled into the light guide element and couples the plurality of collimated light beams out of the light guide element. The angle at which each collimated light beam enters the light guide element is the same as the angle at which the collimated light beam exits the light guide element. The second focusing lens is provided at a position corresponding to the fourth portion, and the second focusing element is configured to receive the plurality of collimated light beams coupled out of the light guide element and focus the plurality of collimated light beams on a sensing element.

Implementation of the present invention at least produces the following advantageous effects:

1. The efficiency of energy use by the spectrometer system is higher than that of a conventional spectrometer, making the spectrometer system more suitable for measuring a relatively weak light source.

2. The spectrometer system can be used to measure the spectrum of the light not only of a point light source and a uniform surface light source, but also of any other surface light sources.

3. The spectrometer system can be used to measure the intensity uniformity and chromatic uniformity of a light source.

BRIEF DESCRIPTION OF THE DRAWINGS

The structure and the technical means adopted by the present invention to achieve the above and other objectives can be best understood by referring to the following detailed description of a preferred embodiment and the accompanying drawings, wherein.

DETAILED DESCRIPTION OF THE INVENTION

Figure 2:
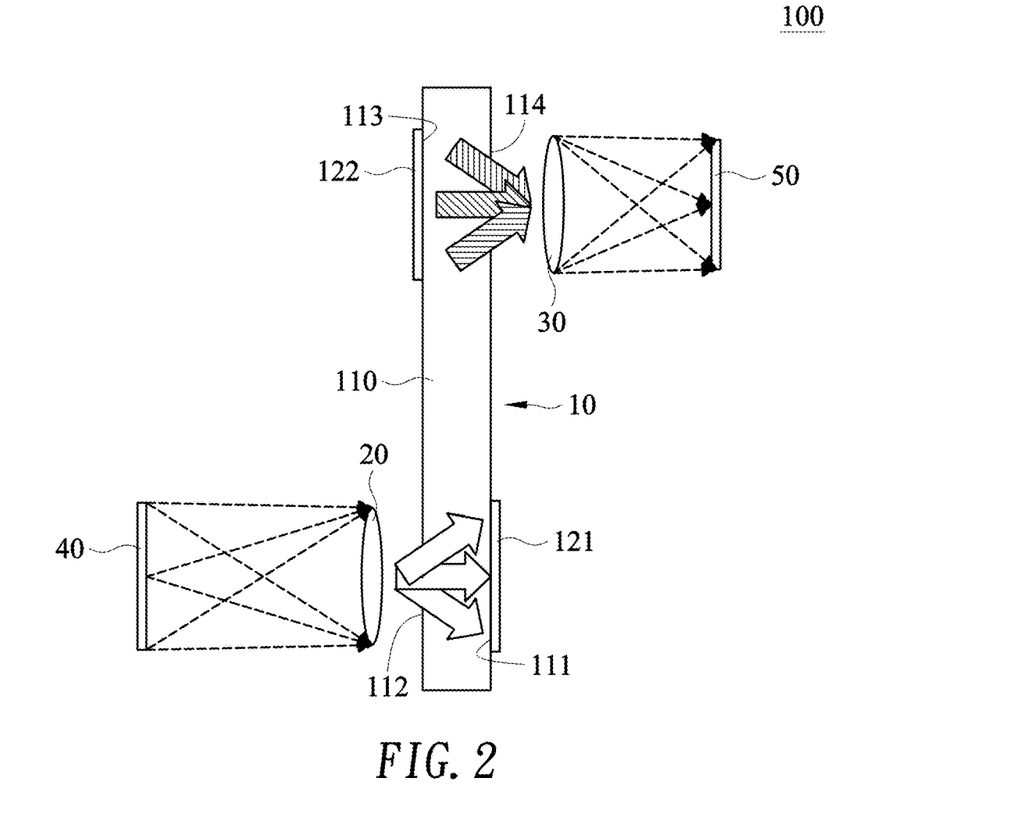
FIG. 2 shows the spectrometer system with a volume holographic light guide element according to an embodiment of the invention.

The embodiment shown in FIG. 2 is a spectrometer system 100 with a volume holographic light guide element, hereinafter referred to as the spectrometer system 100 for short. The spectrometer system 100 includes a volume holographic light guide element 10, a first focusing lens 20, and a second focusing lens 30.

The volume holographic light guide element 10 has a light guide element 110, a first volume holographic element 121, and a second volume holographic element 122.

The surface of the light guide element 110 has a first portion 111, a second portion 112, a third portion 113, and a fourth portion 114.

The first volume holographic element 121 is provided on the first portion 111, and the second volume holographic element 122 is provided on the third portion 113. Each of the first volume holographic element 121 and the second volume holographic element 122 may have a thickness in the range from 12 to 300 μm.

The first volume holographic element 121 and the second volume holographic element 122 are structures whose positions are symmetrically arranged. Both the first volume holographic element 121 and the second volume holographic element 122 may be reflective volume holographic elements.

The first volume holographic element 121 and the second volume holographic element 122 are so configured that, regardless of the angle at which a collimated light beam propagates, only the portion of the light beam whose wavelength corresponds to the volume holographic elements 121 and 122 is allowed to pass therethrough, and that the volume holographic elements 121 and 122 have extremely high diffraction efficiency. Therefore, the first volume holographic element 121 and the second volume holographic element 122 can effectively analyze the intensity of light of specific wavelengths that is emitted from different positions on a to-be-tested light source 40.

The first focusing lens 20 is provided at a position corresponding to the second portion 112. The first focusing lens 20 is configured to receive the light emitted by the point light sources at different positions on the light-emitting area of the to-be-tested light source 40, which is provided at a first focal plane of the first focusing lens 20, and to make the light converge and form a plurality of collimated light beams each propagating at a different angle while being projected to the first volume holographic element 121.

The first volume holographic element 121 diffracts the plurality of collimated light beams and couples the plurality of collimated light beams into the light guide element 110. The second volume holographic element 122 receives the plurality of collimated light beams coupled into the light guide element 110 and couples the plurality of collimated light beams out of the light guide element 110. During the process, the angle at which each collimated light beam enters the light guide element 110 is the same as the angle at which the collimated light beam is output from the light guide element 110.

The second focusing lens 30 is provided at a position corresponding to the fourth portion 114. The second focusing element 30 is configured to receive the plurality of collimated light beams coupled out of the light guide element 110 and focus the plurality of collimated light beams on a sensing element 50.

The spectrometer system 100 may further have a system translation mechanism for supporting, and providing horizontal or vertical displacement of, the spectrometer system 100. Alternatively, the spectrometer system 100 may further have a light source translation mechanism for supporting, and providing horizontal or vertical displacement of, the to-be-tested light source 40. Each of the system translation mechanism and the light source translation system may use a common two-axis (X and Y axes) or three-axis (X, Y, and Z axes) moving platform structure.

By adjusting the relative positions of the spectrometer system 100 and the to-be-tested light source 40, the spectrometer system 100 can be used to measure the spectrum of the light emitted by a surface light source as well as a point light source, with far higher efficiency of measurement than that of a conventional spectrometer. When the to-be-tested light source 40 is a surface light source, the spectrometer system 100 can measure not only the spectrum, but also the uniformity, of the emitted light.

Figure 3:
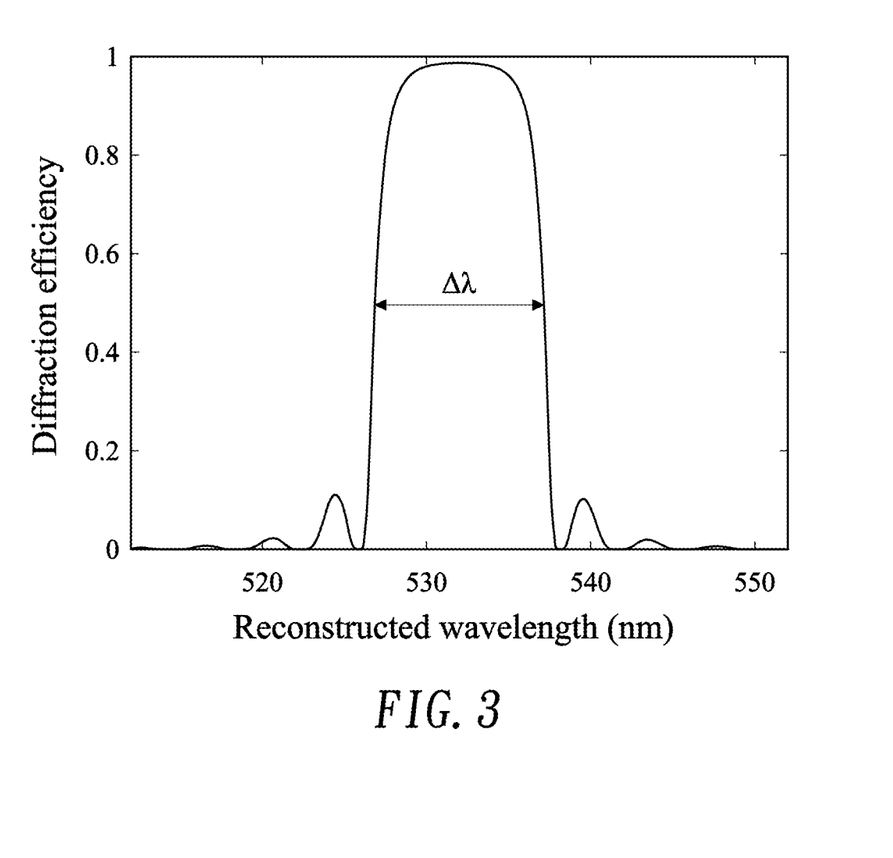
FIG. 3 is a graph showing the wavelength selectivity of the volume holographic light guide element.

FIG. 3 shows a diffraction efficiency curve obtained in the following manner. The to-be-tested light source 40 emitted light having a wavelength of 532 nm. The light entered the spectrometer system 100 along a normal direction of the system and was coupled into the light guide element 110 at a diffraction angle of 55 degrees by way of example. The volume holographic light guide element 10 had a thickness of 16 μm and a refractive index modulation of 0.03. The light emitted from a central position of the to-be-tested light source 40 was coupled to the sensing element 50 through the volume holographic light guide element 10. It can be clearly seen in the diffraction efficiency graph of FIG. 3 that the coupling efficiency of the system lowered significantly when the incident wavelength varied. This phenomenon can be used to design a spectrometer.

Figure 4:
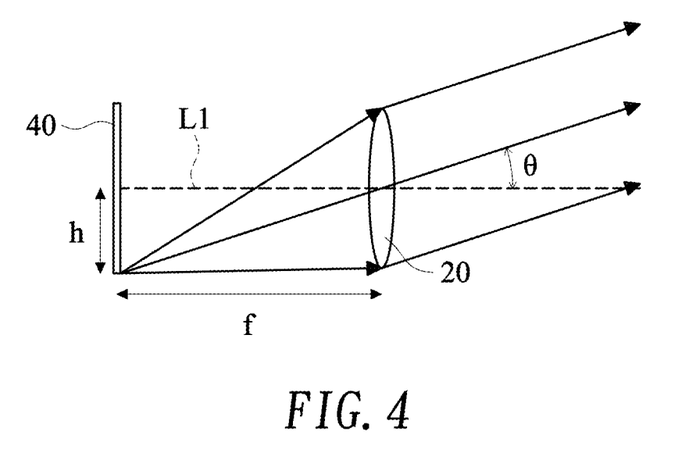
FIG. 4 shows the effect of the relative positions of a light source and a lens on the angle at which light is output from the lens.

Moreover, the narrower the full width at half maximum, A, the higher the resolution of the spectrometer system 100. Therefore, reflective volume holographic elements with a great thickness can be used in this embodiment to ensure wavelength selectivity. In addition, referring to FIG. 4, when a light-emitting point of the to-be-tested light source 40 is offset from the optical axis L1, the light emitted by the light-emitting point will be rendered by the first focusing lens 20 into a collimated light beam that propagates in a slanting manner, and the collimated light beam will be coupled into the volume holographic light guide element 10 also in a slanting manner. The angle θ at which this collimated light beam propagates can be expressed as:

$$\theta = \tan^{-1}(h/f)$$

where: f is the focal length of the first focusing lens 20, and h is the distance between the light-emitting point and the optical axis L1.

Figure 5:
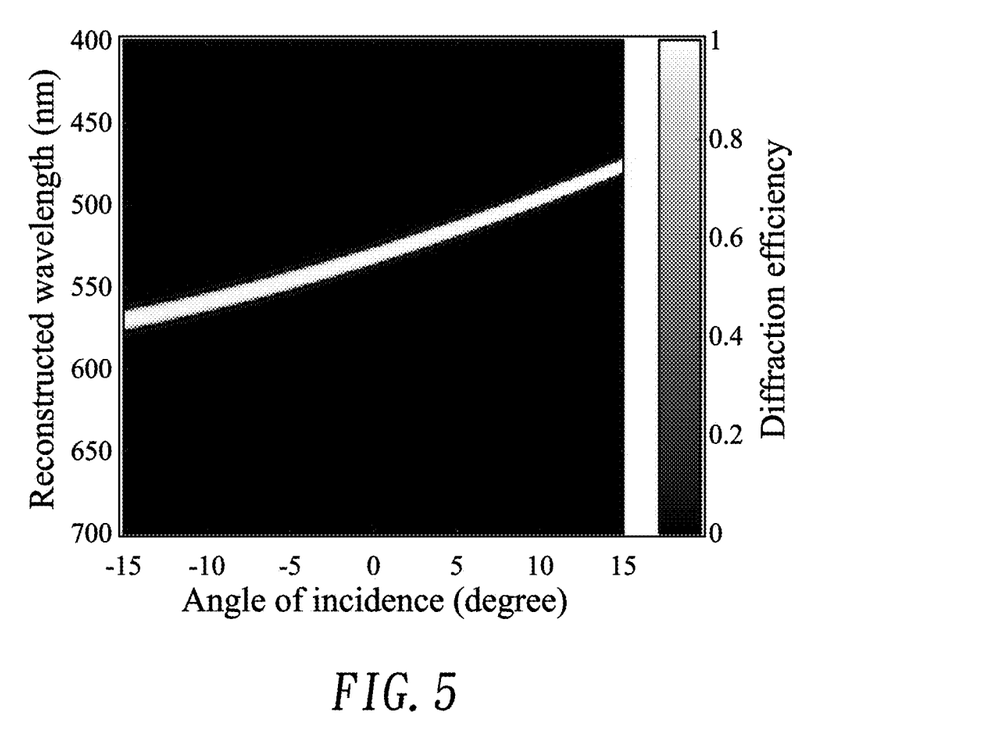
FIG. 5 is a graph showing the diffraction efficiency distribution of the volume holographic elements of the volume holographic light guide element.

When the to-be-tested light source 40 has one or more light-emitting points that are offset from the optical axis, the light emitted by the to-be-tested light source 40 can be viewed as emitted from different light-emitting points and will enter the volume holographic light guide element 10 at different angles, resulting in a coupling efficiency distribution as shown in the graph of FIG. 5.

When the angle of incidence changes, so does the wavelength band that enables Bragg's match and high diffraction efficiency. This explains why the collimated light beams in FIG. 2 that are coupled out of the volume holographic light guide element 10 and propagate at different angles have different wavelengths. Furthermore, the light emitted by a surface light source that contributes to different angles of incidence will eventually converge and become collimated light beams thanks to the second focusing lens 30.

According to the above, the light emitted by the light-emitting points at different positions on the to-be-tested light source 40 will be coupled to the detection end at different angles, and of all the light beams that propagate at different angles, only those having a wavelength corresponding to the volume holographic light guide element 10 will be transmitted by the volume holographic light guide element 10. The Bragg structure of the volume holographic elements allows the spectrometer system 100 to be used to observe the intensity of light of a specific wavelength, wherein the wavelength is associated with the distance between a given light-emitting point on the to-be-tested light source 40 and the optical axis.

To achieve effective measurement, the relative positions of the to-be-tested light source 40 (be it a point or surface light source) and the spectrometer system 100 can be changed in order to measure the spectrum of the light emitted by a point light source or the spectra of the light emitted from different positions on a surface light source. Thus, not only can the chromatic uniformity and brightness uniformity of a point light source or surface light source be measured at the same time, but also when the to-be-tested light source 40 is a uniform surface light source, the spectra of the light emitted by the uniform surface light source can be measured from a single position in on go.

When the first and/or the second volume holographic element 121, 122 has a sufficiently great thickness and a sufficiently high refractive index modulation, the diffraction efficiency of the volume holographic light guide element 10 as a whole will be far higher than that of a single thin grating. Moreover, instead of using a slit to block out stray light, the spectrometer system 100 uses the first and/or the second focusing lens 20, 30 to achieve convergence of light and thereby ensure spatial coherence. When measuring a spectrum, therefore, the spectrometer system 100 in this embodiment uses energy far more efficiently than a conventional spectrometer structure.

Figure 6:
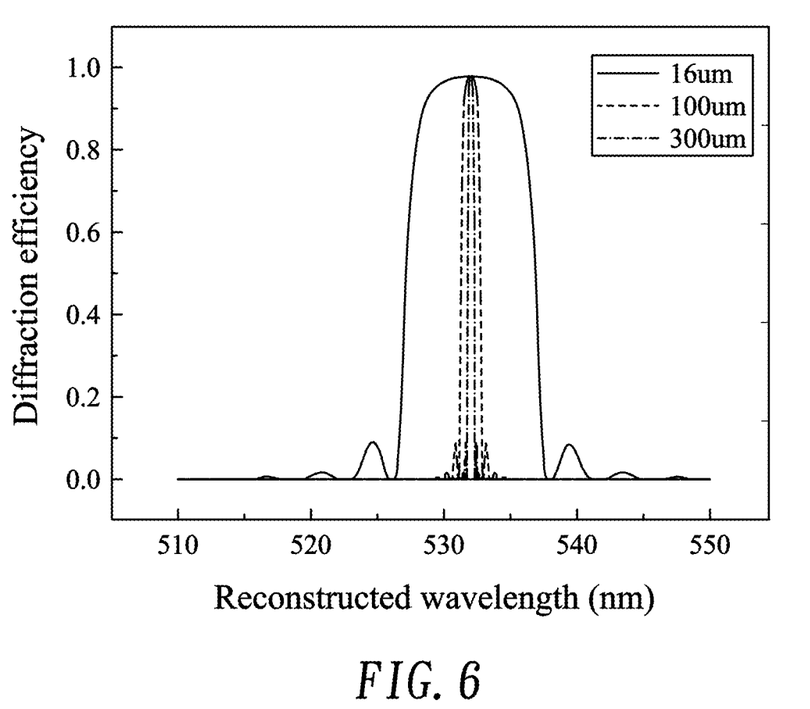
FIG. 6 is a graph showing the full widths at half maximum obtained by varying the thickness of the volume holographic elements while maintaining the coupling strength.

In this embodiment, the fineness of the division of the wavelength bands measurable by the spectrometer system 100 is determined by the wavelength selectivity of the first and the second volume holographic elements 121 and 122, and the wavelength selectivity of the first and the second volume holographic elements 121 and 122 is related to the thickness of material. FIG. 6 shows the diffraction efficiency curves obtained by projecting light of different wavelengths into volume holographic light guide elements 10 of different thicknesses along the normal direction of each volume holographic light guide element. It is known that the coupling strength of each of the volume holographic elements 121 and 122 is in direct proportion to the product of the thickness and the refractive index modulation of the volume holographic element.

The three curves in FIG. 6 represent the efficiency distributions corresponding to: a thickness of 16 μm and a refractive index modulation of 0.0281, a thickness of 100 μm and a refractive index modulation of 0.0045, and a thickness of 300 μm and a refractive index modulation of 0.0015.

Given the conditions stated above, all the volume holographic light guide elements 10 of different thicknesses had 99% diffraction efficiency when the reconstructed wavelength was 532 nm, and the greater the thickness, the narrower the full width at half maximum of the main diffraction peak. Herein, the full width at half maximum of the main diffraction peak is defined as the fineness of measurement, $\Delta\lambda$.

The table below shows the contribution of increasing the thickness of the first and the second volume holographic elements 121 and 122 to wavelength resolution. More specifically, the table shows the refractive index modulation $\Delta n$ and the fineness of measurement, $\Delta\lambda$, corresponding to different thicknesses. When the thickness was increased to 300 μm, the full width at half maximum became 0.5 nm.

| Thickness | 16 | 30 | 60 | 100 | 200 | 300 |
|---|---|---|---|---|---|---|
| Refractive index modulation $\Delta n$ | 0.0281 | 0.0150 | 0.0075 | 0.0045 | 0.00225 | 0.0015 |
| Fineness of measurement, $\Delta\lambda$ (nm) | 9.8 | 5.2 | 2.6 | 1.5 | 0.77 | 0.5 |

The above description is based on only a preferred embodiment of the present invention and is not intended to limit the invention in any way. Although the invention has been disclosed above by way of the preferred embodiment, the embodiment is not intended to limit the invention. A person skilled in the relevant art will recognize that equivalent embodiments can be achieved by modifying, varying, or making equivalent changes to the disclosed embodiment without departing from the scope of the technical solution of the invention. Any simple modification or equivalent change that is made to the above embodiment according to the material contents of the invention shall be regarded as falling within the scope of the technical solution of the invention.

What is claimed is:

1. A spectrometer system with a volume holographic light guide element, comprising:
    the volume holographic light guide element, which has:
        a light guide element having a surface, the surface having a first portion, a second portion, a third portion, and a fourth portion;
        a first volume holographic element provided on the first portion; and
        a second volume holographic element provided on the third portion;
    a first focusing lens provided at a position corresponding to the second portion, the first focusing lens being configured to receive light emitted by point light sources at different positions on a light-emitting area of a to-be-tested light source provided at a focal plane of the first focusing lens and make the light converge and form a plurality of collimated light beams each propagating at a different angle, the plurality of collimated light beams being projected to the first volume holographic element;
    wherein the first volume holographic element diffracts the plurality of collimated light beams and couples the plurality of collimated light beams into the light guide element, and the second volume holographic element receives the plurality of collimated light beams coupled into the light guide element and couples the plurality of collimated light beams out of the light guide element, with each said collimated light beam entering the light guide element and exiting the light guide element at a same angle; and
    a second focusing lens provided at a position corresponding to the fourth portion, the second focusing lens being configured to receive the plurality of collimated light beams coupled out of the light guide element and focus the plurality of collimated light beams on a sensing element.

2. The spectrometer system as claimed in claim 1, further having a system translation mechanism for supporting, and providing horizontal or vertical displacement of, the spectrometer system.

3. The spectrometer system as claimed in claim 1, further having a light source translation mechanism for supporting, and providing horizontal or vertical displacement of, the to-be-tested light source.

4. The spectrometer system as claimed in claim 1, wherein the first volume holographic element and the second volume holographic element are symmetrically disposed structures.

5. The spectrometer system as claimed in claim 1, wherein the first volume holographic element has a thickness in a range from 12 to 300 μm.

6. The spectrometer system as claimed in claim 1, wherein the second volume holographic element has a thickness in a range from 12 to 300 μm.

7. The spectrometer system as claimed in claim 1, wherein each of the first volume holographic element and the second volume holographic element is a reflective volume holographic element.

* * * * *